United States Patent [19]

Vinot

[11] Patent Number: 5,003,060
[45] Date of Patent: Mar. 26, 1991

[54] READILY DISPERSED/DISSOLVED POROUS BIOPOLYMER GRANULES

[75] Inventor: Bernard Vinot, Paris, France

[73] Assignee: Rhone-Poulenc Chimie, Courbevoie, France

[21] Appl. No.: 63,999

[22] Filed: Jun. 19, 1987

[30] Foreign Application Priority Data

Jun. 19, 1986 [FR] France ................. 86 08842

[51] Int. Cl.⁵ ............ B01J 2/16; C12P 19/06; C09K 7/00
[52] U.S. Cl. ..................... 536/114; 106/205; 106/206; 106/208; 252/363.5; 536/3; 536/45; 536/52; 536/56; 536/122
[58] Field of Search ............ 106/205, 206, 208; 536/114

[56] References Cited

U.S. PATENT DOCUMENTS

| | | | |
|---|---|---|---|
| 2,768,143 | 10/1956 | Henry | 252/363.5 |
| 3,850,838 | 11/1974 | Guckenberger et al. | 252/363.5 |
| 4,218,262 | 8/1980 | Warren | 106/206 |
| 4,269,974 | 5/1981 | Wintersdorff | 536/114 |
| 4,340,678 | 7/1982 | Wernau | 536/114 |
| 4,607,099 | 4/1986 | Kanda et al. | 536/114 |
| 4,667,026 | 5/1987 | Jarry et al. | 536/114 |
| 4,670,167 | 6/1987 | Bleeker et al. | 536/114 |
| 4,717,488 | 1/1988 | Seheult et al. | 536/114 |
| 4,746,528 | 5/1988 | Prest et al. | 536/114 |
| 4,753,659 | 6/1988 | Bayerlew et al. | 536/114 |
| 4,803,264 | 2/1989 | Krijnen et al. | 536/114 |
| 4,810,786 | 3/1989 | Kanda et al. | 536/114 |

FOREIGN PATENT DOCUMENTS

| | | | |
|---|---|---|---|
| 0125516 | 11/1984 | European Pat. Off. . | |
| 128661 | 12/1984 | European Pat. Off. | 536/114 |
| 137538 | 4/1985 | European Pat. Off. | 536/114 |
| 0150715 | 8/1985 | European Pat. Off. . | |
| 0180366 | 5/1986 | European Pat. Off. . | |
| 60-72713 | 4/1985 | Japan | 536/114 |
| 149241 | 8/1970 | New Zealand . | |
| 201592 | 4/1986 | New Zealand . | |
| 207043 | 11/1986 | New Zealand . | |
| 209274 | 4/1987 | New Zealand . | |
| 2086204 | 5/1982 | United Kingdom . | |

Primary Examiner—Ronald W. Griffin
Attorney, Agent, or Firm—Burns, Doane, Swecker & Mathis

[57] ABSTRACT

Solid, free-flowing and nondusting porous biopolymer, e.g., xanthan gum, granules are produced in fluidized bed and are quickly dispersed/dissolved in aqueous media for use as thickening agents for a wide variety of applications.

14 Claims, 1 Drawing Sheet

READILY DISPERSED/DISSOLVED POROUS BIOPOLYMER GRANULES

BACKGROUND OF THE INVENTION

1. Field of the Invention

The present invention relates to biopolymer granules of xanthan gum type and to a process for the preparation thereof.

2. Description of the Prior Art

High molecular weight polysaccharides of microbial origin, or biopolymers, produced by fermentation of a carbohydrate which can be assimilated by suitable microorganism, are well known to this art. The most representative example of such polysaccharides is xanthan gum. Because of their thickening properties and their rheology, the polysaccharides have found a variety of applications, especially in the field of foodstuffs and in the building, paint, paper, textile, cosmetic and plant protection chemical industries, in water treatment and in the petroleum industry, for example, in the drilling and the enhanced recovery of oil.

For many applications, the biopolymer must be in the form of a slightly concentrated aqueous solution. It is known that the major disadvantage of biopolymer powders is the difficulty of rapidly dissolving them, even under high-shear agitation. If wetted too quickly, the grains or particulates in contact with water are enveloped within a thin jellified film and become agglomerated. These agglomerates, or lumps, surrounded with partially surface-swollen polymer, disaggregate and dissolve only with difficulty.

Moreover, the biopolymer powder, in the form in which it is currently commercially available, presents safety problems because of the fine particles thereof which form dust clouds.

Intensive investigations have been carried out for many years in an attempt to solve these problems. Different powder formulations, as well as liquid compositions having high active substance concentration, have thus been proposed. Powder formulations are described, for example, in published French Application No. 2,487,368 which recommends coating with a protective layer of a paraffinic material which is expelled in hot water, and in published French Application No. 2,516,527 which teaches the addition of a material which supplies water, or is capable of retaining it by adsorption, such as, for example, silica. To be effective, these solid formulations require relatively large amounts of an adjuvant, the presence of which can be deleterious in certain applications.

Liquid compositions may either be in the form of suspensions in an organic liquid in which the polymer does not dissolve (compare, for example, published French Applications Nos. 2,531,093, 2,540,879, published European Applications Nos. 0,016,640, 0,391,28), or in the form of emulsions (published French Application No. 2,548,676). Liquid compositions have the disadvantage of relatively high cost, because of having to store and transport a large quantity of liquid.

Therefore, serious need still exists for the availability of polysaccharides which are easy to use and which do not display the disadvantages above outlined.

SUMMARY OF THE INVENTION

Accordingly, a major object of the present invention is the provision of improved biopolymers in solid state which contain only minor amounts of anti-agglomerating additives, which can be dispersed instantaneously in water and which quickly dissolve, even in water of high salinity.

Briefly, the biopolymers of the present invention are characterized in that they are in the form of porous granules which contain at least one wetting and/or dispersing agent.

These porous granules are produced by granulating a biopolymer powder in a fluidized bed.

DETAILED DESCRIPTION OF THE PREFERRED EMBODIMENTS OF THE INVENTION

Figure 1:
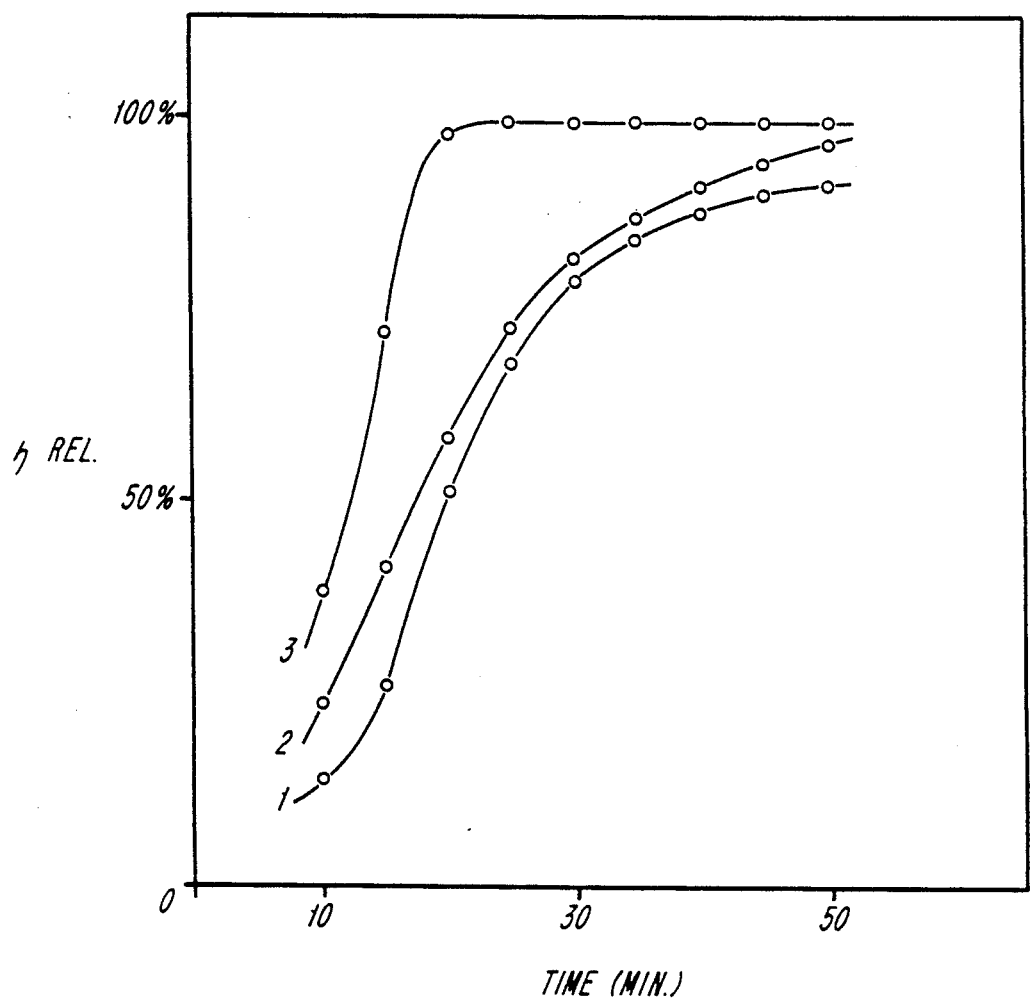

More particularly according to the present invention, the subject biopolymers are produced in known fashion by the fermentation of a carbohydrate under the action of microorganisms. Xanthan gum is synthesized using bacteria which belong to the genus Xanthomonas and more particularly to species described in Bergey's *Manual of Determinative Bacteriology*, 8th Edition, Williams N. Wilkins Co., Baltimore (1974), such as *Xanthomonas begoniae*, *Xanthomonas campestris*, *Xanthomonas carotae*, *Xanthomonas hederae*, *Xanthomonas incanae*, *Xanthomonas malvacaerum*, *Xanthomonas papavericola*, *Xanthomonas phaseoli*, *Xanthomonas Disi*, *Xanthomonas vasculorum*, *Xanthomonas vesicatoria*, *Xanthomonas vitians* and *Xanthomonas pelargonii*. Among other microorganisms capable of producing polysaccharides having similar properties, representative are bacteria which belong to the genus Arthrobacter and more particularly the species *Arthrobacter stabilis* and *Arthrobacter viscosus*: to the genus Erwinia; to the genus Azotobacter and more particularly to the species *Azotobacter indicus*: to the genus Agrobacterium and more particularly to the species *Agrobacterium radiobacter*, *Agrobacterium hizogenes* and *Agrobacterium tumefaciens*; or fungi which belong to the genus Sclerotium and more particularly to the species *Sclerotium glucanicum*, *Sclerotium rolfsii*, and the like.

Experience has shown that some species are capable of producing the polysaccharides particularly efficiently. The species *Xanthomonas campestris* is especially suited for the synthesis of xanthan gum.

The preparation of xanthan gum is described in many publications and in many patents. Compare, for example, U.S. Pat. Nos. 3,020,206, 3,020,207, 3,391,060 and 4,154,654.

Conventionally, the polysaccharide is isolated from the fermentation must by evaporation, drying and grinding, or by precipitation with a lower alcohol, separation of the liquid, drying and grinding such as to provide a powder. The commercially available powders have a particle size typically ranging from 50 to 250 $\mu$m and an apparent density greater than approximately 0.7.

The porous granules according to the invention are produced by granulating the powder in a fluidized bed. According to such process, a fluidized bed is formed from the biopolymer powder using a stream of gas, an aqueous fluid is sprayed onto the powder in order to agglomerate the particles, at least one wetting and/or dispersing agent being introduced either mixed with the biopolymer powder or into the aqueous fluid for spraying, and the product granules obtained are dried simultaneously or subsequently.

The wetting agent is useful for improving the subsequent dissolution of the polysaccharide granules. The wetting agent is advantageously selected from among the surfactants, preferably anionic or nonionic. As representative examples of such wetting agents, the following are illustrative:

(i) Soaps of fatty acids, such as sodium or potassium salts of saturated or unsaturated $C_6$-$C_{24}$ fatty acids, or aminocarboxylic acid derivatives, such as sodium N-lauryl sarcosinate;

(ii) Sulfates and sulfated compounds, such as alkali metal alkyl sulfates of the sodium lauryl sulfate type; polyoxyethyleneated fatty alcohol sulfates; polyoxyethyleneated alkylphenol sulfates an polyoxyethyleneated arylalkylphenol sulfates;

(iii) Phosphoric acid esters of oxyethyleneated compounds, such as polyoxyethyleneated fatty alcohol phosphates; polyoxyethyleneated alkylphenol phosphates and polyoxyethyleneated arylalkylphenol phosphates;

(iv) Alkali metal sulfonates, such as alkylsulfonates, for example alkylsulfoesters of $C_4$-$C_{30}$ acids of the sodium dialkylsulfosuccinate type; alkylbenzenesulfonates, such as sodium nonylbenzenesulfonate and sodium dodecylbenzenesulfonate; and lignosulfonates;

(v) Polyoxyethyleneated alkylphenols, such as polyoxyethyleneated nonylphenol an polyoxyethyleneated dodecylphenol;

(vi) Polyoxyethyleneated and/or polyoxypropyleneated fatty acids and fatty alcohols;

(vii) Polyoxyethyleneated and/or polyoxypropyleneated fatty acid alkanolamides;

(viii) Esters of polyhydric alcohols, such as glycerol or propylene glycol esters of fatty acids oils and nutrient fats, mixtures of fatty acids and acetic and/or lactic and/or citric and/or tartaric acid;

(ix) Saccharose esters, such as sugar esters and sugar glycerides; fatty acid esters of sorbitan; and their polyoxyethyleneated and polyoxypropyleneated derivatives, such as polyoxyethyleneated polyethylene glycol or polypropylene glycol esters, polyoxyethyleneated sorbitan esters, polyoxyethyleneated tartaric acid esters and polyoxyethyleneated oleic glycerides.

Wetting agents which have been found to be particularly useful are sodium dodecylbenzenesulfonate, sodium dioctylsulfosuccinate and the polyoxyethyleneated nonylphenol 10 OE. The wetting agents are advantageously used in an amount of up to approximately 10% by weight of the granule, preferably 0.5 to 5%.

A second additive which may be included in the granule is a water-soluble dispersant. Examples of such dispersants are homopolymers of unsaturated polycarboxylic acids, such as acrylic acid, maleic acid and their low molecular weight copolymers with $C_2$-$C_{12}$ $\alpha$-olefins or vinyl compounds; alkenylsulfonates, such as alkali metal sulfonates of $C_8$-$C_{20}$ $\alpha$-olefins; arylsulfonates and alkylarylsulfonates, such as salts of naphthalenesulfonic and alkylnaphthalenesulfonic acids and their condensation products with formaldehyde; and polyphosphates. The dispersant is advantageously used in an amount which may range up to 10%, preferably 0.5 to 5% by weight.

The particular choice of a wetting and/or dispersing agent may be made depending upon the application envisaged. For example, in the field of foodstuffs, compounds such as sugar glycerides, hexametaphosphates and tripolyphosphates may be employed.

In practice, an additive which has both a good wetting capacity and dispersing capacity, or a combination of a wetting agent and a dispersing agent, will advantageously be employed. A total amount of additive(s) of from 0.5 to 10% by weight of the granule is generally adequate to provide an excellent combination of dispersibility and solubility. However, larger amounts could be employed depending on the intended application and the specific properties of the additive(s).

The wetting/dispersing additive or the mixture of additives may, without any consequences, be solid or liquid and may either be dissolved in the water for spraying, or, if it is solid, be admixed with the biopolymer powder.

The binding capacity of the biopolymer powder makes it possible to granulate same by spraying thereon an aqueous solution which does not contain a specific binding agent.

The fact that no binding agent is included in the water for spraying has the advantage of providing a porous form of granules as a result of the agglomeration of the polymer grains, in contrast to the technique which consists of including in the water for spraying a binding agent, such as the biopolymer itself, which technique would, in this case, produce dense granules which are difficult to solubilize.

The fluidized bed is produced using a stream of gas which preferably has a temperature of 20° to 70° C., with a linear velocity of 0.7 to 5 m/sec. The amount of water sprayed may constitute 5 to 100% of the mass to be granulated. The gas stream which produces the fluidized bed and the amount of water required for the granulation may advantageously be replaced by a stream of humid or saturated vapor.

If desired, various other gums may be added, mixed with the biopolymer powder, such as to produce a granule of a homogeneous mixture of gums. All of the natural, modified natural or synthetic gums may be used for this purpose. Among these gums, carob gum, guar gum, alginates, carrageenates, starches and cellulose derivatives are particularly representative.

The granules formed are dried either simultaneously in the fluidized bed with a hot airstream, or subsequently by any means known per se, until a residual moisture level not normally exceeding 12% is obtained.

Porous granules having an average size of from 0.5 mm to 2 mm, advantageously from 0.5 mm to 1 mm, an apparent density less than 0.7, more particularly between 0.3 and 0.5, are produced by the process of the invention. The degree of aeration, or porosity, expressed as the ratio:

$$1-\left(\frac{\text{apparent density of the granules}}{\text{apparent density of the powder}}\right)100,$$

ranges from 40 to 60%.

The granules flow freely and do not form dust or fines during handling. They disperse instantaneously in water under slight agitation, without requiring special precautions and without forming lumps, thus improving the dissolution time. A solution of the biopolymer is thus rapidly obtained by pouring the entire amount of granules in a single batch.

The capacity of the granules to dissolve more rapidly than conventional powders confirms their value for use in related foodstuff applications and in all industries requiring viscosity-enhanced aqueous fluids. They are particularly suitable for use on a site of end application, such as, for example, an oil field.

In order to further illustrate the present invention and the advantages thereof, the following specific examples are given, it being understood that same are intended only as illustrative and in nowise limitative.

In said examples to follow, the polysaccharide used was the xanthan gum marketed under the trademark RHODOPOL 23® by Rhône-Poulenc Spécialité s Chimiques. Its properties were as follows:

| Physical state | powder |
|---|---|
| Apparent density (g/cm$^3$) | 0.8 |
| Humidity | 12% maximum |
| Particle size | <250 μm (of which 95% < 175 μm and 50% < 75 μm). |

A laboratory fluidized bed granulator AEROMATIC®, having a volume of 16.5 liters, was used for the granulation.

EXAMPLE 1

200 g of xanthan powder were introduced into the granulator. The powder was converted into a fluidized bed by injecting air heated to 30° C., with a flow rate of 30 m$^3$/hour. Water was sprayed, using a twin fluid nozzle ($\phi=0.5$ mm), at a flow rate of 20 ml/min for 5 minutes.

The granules produced were dried until a residual water content of 10% was obtained. They were fluid, free-flowing and dispersed instantaneously in water. Their properties were as follows:

| Size | 0.5–1 mm |
|---|---|
| Density | 0.35 |
| Degree of porosity | 60%. |

EXAMPLE 2

200 g of xanthan powder were mixed in a ROWENTA® mixer with 9 g of sodium polymethylene methylnaphthalenesulfonate (SUPRAGIL® MNS 90) and 1 g of sodium dioctylsulfosuccinate. The mixture of powders was introduced into the granulator, fluidized, granulated and then dried according to the conditions given in Example 1. The properties of the granules (size, density and degree of porosity) were identical.

The granules of Examples 1 and 2 were tested for their dissolution velocity: a solution was prepared in a beaker by pouring 0.5 g of granules into 100 g of saline water containing 50 g/l of NaCl and 5 g/l of CaCl$_2$.2H$_2$O, in a single batch and without any precautions, the mixture being stirred slowly (bar magnet). The stirring was continued until a constant viscosity was obtained. The results are illustrated on curves 2 (Example 1) and 3 (Example 2) of the Figure of Drawing in comparison with the initial xanthan powder (curve 1).

The relative viscosities were measured using a Brookfield® LVT viscometer, speed: 30 rpm, spindle: No. 2, 20° C.

EXAMPLE 3

Various granulations were carried out under the same conditions as in Example 1, except that water was replaced with an aqueous solution containing different wetting and dispersing additives. The concentration of the solution was adjusted such a to produce the compositions given in the following Table.

Wetting agents used:
(1) Na dioctylsulfosuccinate;
(2) Na dodecylbenzenesulfonate;
(3) Polyoxyethyleneated nonylphenol 10 EO;
(4) Sugar glycerides of palm oil=CEDYNOL® PIM, marketed by RHONE-POULENC;
(5) OE-OP fatty alcohols: SOPROPHOR® BO 327, marketed by RHONE-POULENC.

Dispersing agents:
(1) Maleic anhydride/diisobutylene copolymer, having a weight average molecular weight of approximately 10,000;
(2) SOPROPON® T 36 K, marketed by RHONE-POULENC;
(3) Sodium polymethylene naphthalenesulfonate;
(4) SUPRAGIL® A, marketed by RHONE-POULENC.

Wetting/dispersing agent:
(1) Phosphate of polyoxyethyleneated tri(1-phenylethyl)phenol 16 EO;
(2) SOPROPHOR® 3 D 33, marketed by RHONE-POULENC.

Using the granules produced, 5,000 ppm solutions of xanthan were prepared in a saline water containing 100 g/l NaCl+10 g/l CaCl$_2$.2H$_2$O.

The compositions of the granules and the results are reported in the Table:

TABLE

| Composition of the granule in % | | Dispersibility | solubility | Size of granules |
|---|---|---|---|---|
| Xanthan | 95 | G | G | ~1 mm |
| Maleic anhydride/diisobutylene copolymer (K salt) | 5 | | tendency to float on the surface | |
| Xanthan | 95 | VG | VG | ~1 mm |
| Maleic anhydride/diisobutylene copolymer (K salt) | 4.5 | | | |
| Sodium dioctylsulfosuccinate | 0.5 | | | |
| Xanthan | 97 | VG | VG | ~0.5 mm |
| Oxyethyleneated nonylphenol | 3 | | | |
| Xanthan | 97 | VG | VG | ~0.5 mm |
| Phosphate of oxyethyleneated tri-(1-phenylethyl)-phenol | 3 | | tendency to float on the surface | |
| Xanthan | 96.5 | VG | VG | ~0.5 mm |
| Oxyethyleneated alkylphenolphosphate | 3 | | | |
| Sodium dioctylsulfosuccinate | 0.5 | | | |
| Xanthan | 95 | G | G | ~1 mm |
| Sodium polymethylene naphthlenesulfonate | 5 | | | |
| Xanthan | 95 | VG | VG | ~0.5–1 mm |
| Sodium polymethylene naphthalenesulfonate | 4.5 | | | |
| Sodium dioctylsulfosuccinate | 0.5 | | | |
| Xanthan | 95 | VG | VG | ~1 mm |
| Sodium dodecylbenzenesulfonate | 5 | | | |
| Xanthan | 99 | VG | VG | ~0.5–1 mm |
| Palm oil sugar glyceride | 1 | | | |
| Xanthan | 98.5 | VG | VG | ~0.5–1 mm |
| OE-OP fatty | 1.5 | | | |

| Composition of the granule in % | Dispersibility | solubility | Size of granules |
|---|---|---|---|
| alcohol | | | |

VG: very good - solubility <30 min
G: good - solubility <45 min

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Solid, free-flowing and nondusting porous polysaccharide biopolymer granules readily dispersible and soluble in water, said granules comprising at least one wetting agent, dispersing agent, or combination thereof.

2. The porous biopolymer granules as defined by claim 1, having an average particle size of 0.5 to 2 mm and an apparent density of less than 0.7.

3. The porous biopolymer granules as defined by claim 1, having a degree of porosity of from 40 to 60%.

4. The porous biopolymer granules as defined by claim 1, comprising from 0.5 to 10% by weight of said at least one wetting and/or dispersing agent.

5. The porous biopolymer granules as defined by claim 1, comprising up to 12% by weight of residual moisture content.

6. The porous biopolymer granules as defined by claim 1, said at least one wetting and/or dispersing agent comprising a surfactant.

7. The porous biopolymer granules as defined by claim 5, said surfactant comprising a soap of a fatty acid, sulfate or sulfated compound, a phosphoric acid ester of an oxyethyleneated compound, an alkali metal sulfonate, polyoxyethyleneated alkylphenol, polyoxyethyleneated and/or polyoxypropyleneated fatty alcohol or fatty acid, fatty acid alkanolamide, an ester of a polyhydric alcohol or polyoxyethyleneated derivative thereof.

8. The porous biopolymer granules as defined by claim 7, said surfactant comprising a polyoxyethyleneated nonylphenol, an alkali metal alkylbenzenesulfonate, an alkali metal sulfosuccinate, a sugar glyceride, or a polyoxyethyleneated fatty alcohol.

9. The porous biopolymer granules as defined by claim 1, said at least one wetting and/or dispersing agent comprising a homopolymer of an unsaturated carboxylic acid or copolymer thereof with an α-olefin, an alkenylsulfonate, a naphthalenesulfonate or an alkylnaphthalenesulfonate or polyphosphate.

10. The porous biopolymer granules as defined by claim 1, said at least one wetting and/or dispersing agent comprising admixture of sodium polymethylene naphthalenesulfonate and sodium dioctylsulfosuccinate.

11. The porous biopolymer granules as defined by claim 1, said biopolymer comprising xanthan gum.

12. The porous biopolymer granules as defined by claim 1, said biopolymer being mixed with a natural, modified natural or synthetic gum.

13. A process for the production of the porous biopolymer granules as defined by claim 1, comprising (i) fluidizing a biopolymer powder in a stream of gas (ii) agglomerating the particles thus fluidized by spraying an aqueous fluid thereon, (iii) at least one wetting and/or dispersing agent either being admixed with said biopolymer powder or incorporated in the spray of aqueous liquid, and (iv) drying the granules thus produced.

14. The process as defined by claim 13, wherein the amount of aqueous liquid sprayed comprises from 5 to 100% by weight of the mass to be granulated.

* * * * *